United States Patent [19]

Maeyerspeer

[11] 4,060,278
[45] Nov. 29, 1977

[54] ENERGY ABSORBING MEMBER

[75] Inventor: Bernhard Maeyerspeer, Stuttgart, Germany

[73] Assignee: Firma Porsche Design, Germany

[21] Appl. No.: 629,624

[22] Filed: Nov. 7, 1975

[30] Foreign Application Priority Data

Nov. 3, 1974    Germany ............................ 2452336

[51] Int. Cl.$^2$ ............................................. A62B 35/00
[52] U.S. Cl. ................................. 297/386; 188/1 C; 280/746
[58] Field of Search ........................ 188/1 C; 297/386; 280/746

[56]  References Cited

U.S. PATENT DOCUMENTS

| 2,352,036 | 6/1944  | Tauty ........................... 297/386 UX |
| 2,670,967 | 3/1954  | Kean ................................... 280/746 |
| 3,412,628 | 11/1968 | De Gain ............................. 188/1 C |
| 3,550,957 | 12/1970 | Radke .................................. 297/386 |
| 3,586,131 | 6/1971  | Le Mire .............................. 297/386 |
| 3,612,223 | 10/1971 | Shriomi et al. ..................... 188/1 C |
| 3,624,764 | 11/1971 | Goben ................................. 188/1 C |
| 3,694,028 | 9/1972  | Andres et al. ....................... 188/1 C |
| 3,765,335 | 10/1973 | Blair et al. .......................... 188/1 C |

FOREIGN PATENT DOCUMENTS 1,393,185   2/1965   France ................................ 297/386

Primary Examiner—James T. McCall
Attorney, Agent, or Firm—Craig & Antonelli

[57] ABSTRACT

An energy absorbing arrangement for a safety belt including a metal band provided with a plurality of elongated slots arranged in staggered parallel rows extending transversely to the direction of the loading of the safety belt. The slots form real tear points or desired points of separation which function to absorb or dissipate force due to impact loading of the safety belt.

9 Claims, 4 Drawing Figures

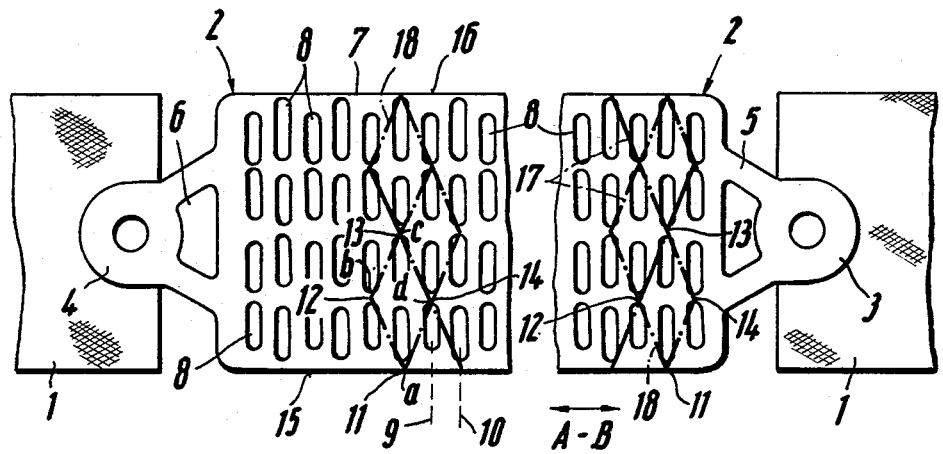
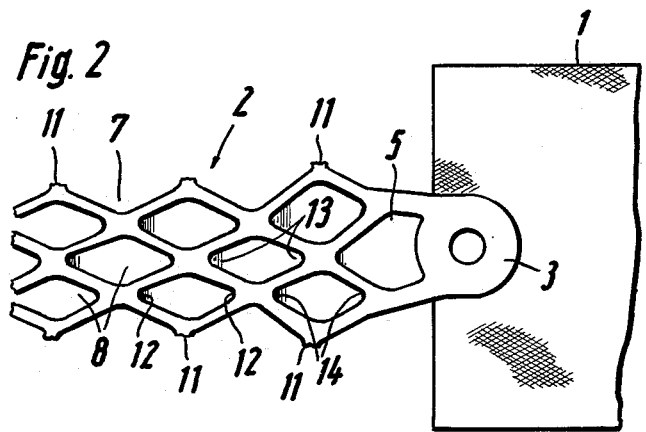
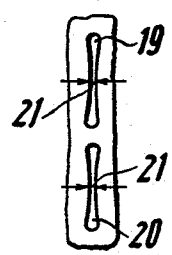
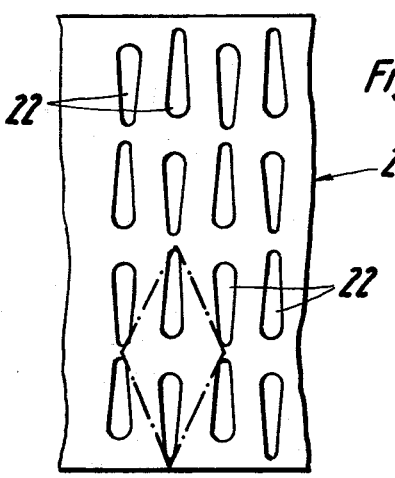

ENERGY ABSORBING MEMBER

The present invention relates to an energy absorbing member, and more particularly to an energy absorbing or force limiting member for safety belts which is constructed as a stretchable metal band in which openings are provided.

Energy absorbing members which stretch under tensile stress have been proposed, for example, in DT-OS 2,233,421 wherein the metal member is formed by a metal band having openings arranged one behind the other in the load direction with the openings exhibiting a relatively large extension in the load direction. However, such proposed construction has the disadvantage that the available distance for stretching of the metal band is very small and the band thereby quickly arrives within the area of the breaking limit. By virtue of this fact, the function of the energy absorbing member and the safety belt to whch the member is attached is disadvantageously impaired.

The present invention is concerned with the task to provide a structurally simple energy-absorbing arrangement which functions realiably while eliminating the aforementioned shortcomings.

The underlying problems are solved in accordance with the present invention in that the metal band is provided with a plurality of small slots arranged one next to the other in parallel rows extending transversely or cross wise to the direction of loading of the safety belt with some of the slots forming real tear points or desired separation points at the metal band to absorb or dissipate impact energy.

According to one advantageous feature of the present invention, the real-tear points or separation points are formed by relatively thin straps or strips arranged between the slots themselves and the respective edges of the metal band. Preferably, the arrangement of the real-tear points or separations points is determined by the corners of double-rowed auxiliary rhombics.

According to further features of the present invention, the slots may be elongated in configuration, provided with constrictions and may run together or taper so as to result in a substantially V-shaped slot extending in the direction of the real-tear or separation points.

The advantages of the energy absorbing construction in accordance with the present invention reside in the fact that through relatively small slots, a remarkable distance or travel for the energy absorbing member is realized thereby providing a substantial energy absorption or dissipation. Additionally, the efficiency of the member with the real-tear or separation point in considerably improved. Furthermore, the arrangement of the real-tear or separation points in accordance with the present invention makes a favorable deformation process of the energy absorbing member possible.

Accordingly, it is an object of the present invention to provide an energy absorbing arrangement for a safety belt system which avoids by simple means the aforementioned shortcomings and drawbacks encountered in the prior art.

Another object of the present invention resides in providing an energy absorbing arrangement which is relatively simple in construction and therefore, also relatively inexpensive.

A further object of the present invention resides in an energy absorbing arrangement which assures a favorable energy absorption or dissipation upon an impact loading of the present invention.

These and further objects, features and advantages of the present invention will become more apparent from the following description when taken in connection with the accompanying drawing which shows, for the purposes of illustration only, two embodiments in accordance with the present invention, and wherein:

FIG. 1 is a top view of an energy absorbing member in accordance with the present invention arranged in a seat belt;

FIG. 2 is a top view of the energy absorbing member of FIG. 1 in a deformed condition;

FIG. 3 is a view of a modified slot construction for an energy absorbing member in accordance with the present invention; and FIG. 4 is a partial top view of a further embodiment of an energy absorbing member in accordance with the present invention.

Referring now to the drawings wherein like reference numerals are used throughout the various views to designate like parts, and more particularly to FIG. 1, according to this Figure, an energy absorbing or force limiting member generally designated by the reference numeral 2 is inserted or attached to the respective ends of a safety belt 1. The member 2 is formed by a metal band having a generally rectangular configuration defining a working area 7 with fastening eyes 3, 4 being provided at respective lateral sides of the working area 7 and with slots or openings 5, 6 being disposed between the edges 3, 4 and the working area 7.

A plurality of elongated slots 8 are arranged in the working area 7 one next to the other so as to be disposed in parallel rows two of which have been designated by the reference numerals 9, 10. The slots 8 are provided at the working area such that the respective axial lengths extend transversely to the direction of loading indicated by the double arrow designated A-B.

As can be seen from FIG. 1, the slots in each row are staggered with respect to the slots in adjacent parallel rows on both sides thereof such that real-tear or separation points, for example, points 11, 12, 13, 14 are created. The real-tear or separation points 11, 12, 13, 14 are formed by thin strips or straps which are disposed between the slots 8 and the lateral edges 15, 16 of the member 2.

The strap between the slots 8 and the lateral edges 15, 16 are dimensioned in such a manner that they correspond to the amount of energy to be absorbed or dissipated due to an impact loading of the safety belt 1. The arrangement of the real-tear points 11, 12, 13, 14 is determined by corners a, b, c, d of double-rowed auxiliary rhombics 17, 18 illustrated in dot and dash line in FIG. 1.

As shown in FIG. 2, if the energy absorbing or force limiting member 2 is stressed by a predetermined force in the direction of loading A-B, the slots are deformed and the real-tear or separation points 11, 12, 13, 14 are separated. By virtue of this separation, during a loading of the belt, for example, due to a collision or the like energy is absorbed or dissipated thereby limiting the force which acts on a person using the safety belt 1.

According to FIG. 3, the slot 19, 20 may be provided with constrictions 21 whereby a favorable force-travel or distance ratio is realized during an impact loading of the safety belt 1. While only two slots are illustrated in FIG. 3, it is understood that the slots are arranged in spaced parallel rows in the manner illustrated in FIG. 1.

According to FIG. 4, slots 22 are provided on the energy absorbing member 2 which slots run together or are tapered so as to result in a substantially V-shaped configuration with the tapered or narrow portion of the slots 22 extending in the direction of the real-tear or separation points whereby the force-distance ratio is also favorably influenced.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An energy absorbing arrangement comprising:
   a safety belt means,
   an energy absorbing band arranged in said safety belt means for absorbing energy resulting from an impact load on said safety belt means,
   said band includes spaced lateral edges,
   a plurality of slots provided in said band, said slots being disposed adjacent one another in a plurality of spaced parallel rows extending transversely to a loading direction of the energy absorbing band, and
   means defining predetermined separation points on said energy absorbing band for dissipating energy resulting from an impact load including dimensioned strips of said energy absorbing band disposed between at least some of adjacent slots in at least one of said parallel rows and between at least one of said slots and one of said spaced lateral edges.

2. An arrangement according to claim 1, wherein said energy absorbing band is formed of a metallic material.

3. An arrangement according to claim 1, wherein said means defining separation points for dissipating energy are arranged on said energy absorbing hand so as to define corners of a doublerowed rhombic.

4. An arrangement according to claim 3, wherein each of said slots is elongated in a direction toward the spaced lateral edges.

5. An arrangement according to claim 4, wherein at least one constriction is provided in each of said elongated slots.

6. An energy absorbing arrangement comprising:
   a safety belt means,
   an energy absorbing band formed of a metallic material arranged in said safety belt means for absorbing energy resulting from an impact load on the safety belt means,
   a plurality of slots provided in said band, said slots being disposed adjacent one another in a plurality of spaced parallel rows extending transversely to a loading direction of the energy absorbing band, and
   means defining predetermined separation points on said energy absorbing band for dissipating energy resulting from an impact load,
   each of said slots is a tapered elongated slot having a substantially V-shaped configuration with the respective narrowed portions of each elongated slot being arranged in a direction toward said means defining separation points for dissipating energy.

7. An energy absorbing arrangement comprising:
   a band for absorbing energy resulting from an impact load thereon, said band including spaced lateral edges,
   a plurality of slots provided in said band and arranged adjacent one another into a plurality of spaced parallel rows extending transversely to a loading direction of the energy absorbing band,
   a strip of band material being provided between adjacent slots in each of said rows and between laterally outermost slots in each row and an associated lateral edge,
   at least some of said strips of material having a predetermined dimension so as to define a plurality of intentional separation points of the band such that upon an impact load on said band impact energy is absorbed and dissipated by said band separating along said separation points.

8. An arrangement according to claim 7, wherein each of said slots are provided with a constriction.

9. An arrangement according to claim 7, wherein each of said slots have a substantially V-shaped configuration with a narrowed portion of each slot extending in a direction toward the separation points.

* * * * *